United States Patent [19]

Cogan et al.

[11] Patent Number: 5,080,471
[45] Date of Patent: Jan. 14, 1992

[54] ELECTROCHROMIC MATERIAL AND ELECTRO-OPTICAL DEVICE USING SAME

[75] Inventors: Stuart F. Cogan, Sudbury; R. David Rauh, Newton, both of Mass.

[73] Assignee: EIC Laboratories, Inc., Norwood, Mass.

[21] Appl. No.: 506,340

[22] Filed: Apr. 6, 1990

[51] Int. Cl.⁵ .............................................. G02F 1/01
[52] U.S. Cl. ................................... 359/275; 359/265
[58] Field of Search ................ 350/357; 429/194, 202, 429/209

[56] References Cited

U.S. PATENT DOCUMENTS

| | | | |
|---|---|---|---|
| 4,294,520 | 10/1981 | Inoue et al. | 350/357 |
| 4,392,721 | 7/1983 | Giglia et al. | 350/357 |
| 4,416,517 | 11/1983 | Beall et al. | 350/357 |
| 4,482,216 | 11/1984 | Hashimoto et al. | 350/357 |
| 4,645,308 | 2/1987 | Tracy et al. | 350/357 |
| 4,741,603 | 6/1988 | Miyagi et al. | 350/357 |
| 4,750,817 | 6/1988 | Sammells | 350/357 |
| 4,787,717 | 11/1988 | Belgart et al. | 350/357 |
| 4,832,403 | 5/1989 | Goldner et al. | 350/357 |
| 4,832,467 | 5/1989 | Miyagi et al. | 350/357 |
| 4,869,980 | 9/1989 | Jarvis et al. | 429/202 |

FOREIGN PATENT DOCUMENTS

| | | | |
|---|---|---|---|
| 52-73749 | 6/1977 | Japan | 350/357 |
| 59-228628 | 12/1984 | Japan | 350/357 |
| 59-232316 | 12/1984 | Japan | 350/357 |
| 61-086733 | 5/1986 | Japan | 350/357 |
| 61-103982 | 5/1986 | Japan | 350/357 |
| 62-279317 | 12/1987 | Japan | 350/357 |

OTHER PUBLICATIONS

"Lithium and Sodium insertion in Ternary Chromium Oxides", Koksbang et al., Solid State Ionics, 28–30, 1988, pp. 868–872.
Besenhard and Schöllhorn "Chromium Oxides as Cathodes for Secondary High Energy Density Lithium Batteries", J. Electrochem. Soc., 124 (1977), pp. 968–971.
Koksbang et al., "Lithium Insertion in $LiCr_3O_8$, $NaCr_3O_8$, and $KCr_3O_8$ at Room Temperature and at 125° C.", J. Electrochem. Soc., 136 (1989), pp. 598–605.
Koksbang et al., "Lithium and Sodium Insertion in Ternary Chromium Oxides", Solid State Ionics, 28–30 (1988), pp. 868–872.

Primary Examiner—Rolf Hille
Assistant Examiner—Mahshid Saadat

[57] ABSTRACT

An oxidatively coloring electrochromic layer of composition $M_yCrO_{2+x}$ ($0.33 \leq y \leq 2.0$ and $x \leq 2$) where M = Li, Na or K with improved transmittance modulation, improved thermal and environmental stability, and improved resistance to degradation in organic liquid and polymeric electrolytes. The $M_yCrO_{2-x}$ provides complementary optical modulation to cathodically coloring materials in thin-film electrochromic glazings and electrochromic devices employing polymeric $Li^+$ ion conductors.

11 Claims, 12 Drawing Sheets

ELECTROCHROMIC MATERIAL AND ELECTRO-OPTICAL DEVICE USING SAME

The invention was made with Government support under Contract No. DE-AC03-87SF16733 awarded by the U.S. Department of Energy. The Government has certain rights to this invention.

FIELD OF THE INVENTION

This invention relates to electro-optical devices employing electrochromic materials.

BACKGROUND OF THE INVENTION

An electrochromic material changes its optical properties in response to an electrically driven change in its state of oxidation or reduction. An applied voltage from an external power supply causes electrons to flow to (reduction) or from (oxidation) the electrochromic material. In order to maintain charge neutrality, a charge balancing flow of ions occurs in the electrochromic device. To mediate between the electron and ion flow, an electrochromic device must provide for reversible oxidation and reduction reactions during optical switching. Most prior art devices contain an electrochromic material such as a-$WO_3$ (a=amorphous) which becomes colored on reduction. There must also be provision in the device for a corresponding oxidation reaction during coloring. The oxidation reaction is usually provided for by the use of a counter electrode.

A major consideration in electrochromic devices is the material of the counter electrode. For variable transmittance electrochromic devices, the oxidation and reduction of the counter electrode must not interfere with the transmittance modulation of the device. Counter electrodes in variable transmittance devices can utilize materials that are substantially transparent and which undergo very little optical modulation on reduction and oxidation. Examples of such materials are $Nb_2O_5$ and $TiO_2$ (S. Cogan et al., Proc. S.P.I.E., vol 562, (1985), pp. 23-31) or a "macroporous" layer of crystalline $WO_3$ (U.S. Pat. No. 4,278,329, K. Matsuhiro and Y. Masuda, July 1981). The counter electrode may also be a reduction-oxidation couple dissolved in a liquid or semi-solid electrolyte (U.S. Pat. No. 4,550,982, Y. Hirai, November 1985). The most useful counter electrode, however, is itself an electrochromic material which colors and bleaches in tandem with the principal electrochromic material. In the case of electrochromic devices employing a combination of a-$WO_3$ and $IrO_2$, for example, the a-$WO_3$ colors on reduction and the $IrO_2$ colors on oxidation. Both layers therefore contribute to the optical modulation, improving both the efficiency of the optical change and increasing the maximum transmittance range over which the device may switch. The a-$WO_3$/$IrO_2$ electrochromic device employs $H^+$ as the charge-balancing counter ion. Examples of such devices in prior art include Takahashi et al., U.S. Pat. No. 4,350,414, September 1982 and Cogan et al., Proc. S.P.I.E., vol 823, (1987) pp. 106-112.

In many applications, electrochromic devices will encounter elevated temperatures and high solar irradiance. Temperatures of automobile sunroofs, aircraft canopies, and building windows may exceed 100° C. Any deleterious effect of such high temperatures is compounded by the concomitant high levels of irradiance which may result in photothermal or photoelectrochemical degradation. A major contributor to such degradation is residual water in the electrochromic electrodes or in the ion conducting layer. It is common in many prior art electrochromic devices to employ a proton ($H^+$) or hydroxyl ($OH^-$) as the counter ion. The use of these ions necessitates the incorporation of some amount of lattice water in both the ion conducting and electrochromic layers. The $H_2O$ is necessary to achieve the desired level of ionic conductivity. It is most desirable to avoid residual water by employing a counter ion other than $H^+$ or $OH^-$.

If an electrochromic device is to have reproducible and predictable optical switching behavior and exhibit a high switching cycle lifetime, then the electrochemical oxidation and reduction reactions at both the electrochromic electrode and the counter electrode must be reversible and free of parasitic side reactions. These considerations are of paramount importance in applications where high switching cycle lifetimes and long service life are required such as a variable transmittance glazing on architectural glass.

Furthermore, if the electrochemical reactions at both electrodes are well-defined and reversible, an electrochromic device may be constructed with optical properties uniquely determined by the switching voltage. A unique relationship between optical properties and applied switching voltage is advantageous because it eliminates the need for external sensors to measure the optical state during switching and it greatly simplifies the design of power supplies and makes it practical to switch a large number of electrochromic devices in an identical manner (such as electrochromic windows in an office building).

SUMMARY OF THE INVENTION

It is an object of the present invention to provide an electro-optical device containing two electrochromic materials, one coloring by reduction and the other coloring by oxidation. In the present invention, therefore, the distinction between the electrochromic electrode and the counter electrode is removed. Both electrodes are electrochromic and contribute to the overall optical modulation of the device and both electrodes provide reversible oxidation and reduction reactions that are mutually charge-balancing.

The oxidatively coloring electrochromic material is $M_yCrO_{2-x}$ ($0.33 \leq y \leq 2.0$ and $x \leq 2$) where M=Li, Na, or K.

A further object of the present invention is an electrochromic device with improved thermal and environmental stability. Accordingly, the electro-optical device of the present invention employs $Li^+$ as the charge-balancing counter-ion.

Another object of the present invention is an oxidatively coloring electrochromic material that exhibits an improved (increased) capacity for reversible lithium insertion/extraction. The increased capacity allows thinner films to be employed in electrochromic devices, with corresponding improvements in the maximum achievable transmittance and range of transmittance switching.

A further object of the present invention is an oxidatively coloring electrochromic material that exhibits improved stability in contact with organic liquid and polymeric electrolytes.

DESCRIPTION OF THE PREFERRED EMBODIMENTS

Figure 1:
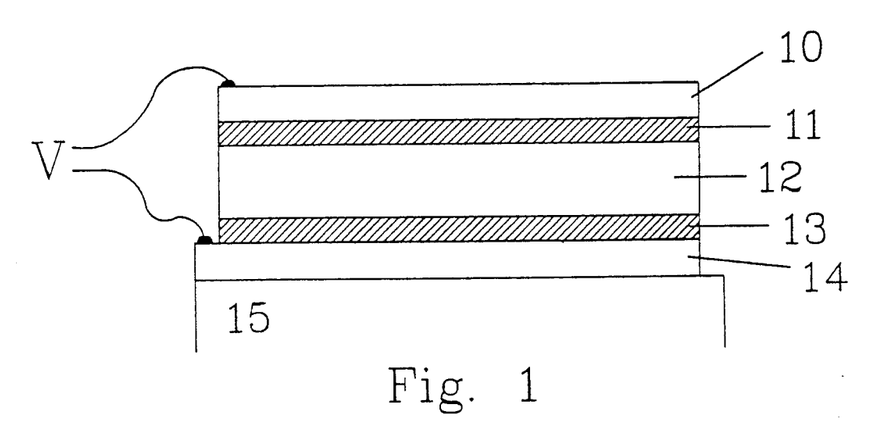
FIG. 1 is a cross-sectional view of an electro-optical device of the present invention embodying a solid ion conducting layer in an all-solid-state glazing configuration.

Referring to FIG. 1, a cross-sectional view of an electrochromic device of the present invention in a preferred embodiment is shown. The device contains five layers disposed sequentially over a substrate (15). Layers 10 and 14 are thin-film, transparent electronic contacts which supply current to the electrochromic layers. Preferred materials for the transparent electrical contacts (10,14) include tin-doped indium oxide and aluminum-doped zinc oxide. Layer 13 is a film of electrochromic $M_yCrO_{2+x}$ which is transparent when reduced and colored when oxidized. Layer 11 is an electrochromic material that is reversibly oxidizable and reducible and colors on reduction. Preferred materials for layer 11 include amorphous or crystalline $WO_3$, amorphous or crystalline $MoO_3$, crystalline $K_xWO_{3-x/2}$, or mixtures thereof. Separating the aforementioned electrochromic layers is a $Li^+$ ion-conducting layer (12) that has a high electronic resistivity. Preferred materials for the $Li^+$ ion conducting layer include $Li_2O$—$B_2O_3$ mixtures, ternary mixtures of $Li_2O$—$B_2O_3$ and alkali halides such LiCl and LiBr (U.S. Pat. No. 4,184,015, June 1980), $LiAlF_4$, and ternary mixtures of $Li_2O$—$SiO_2$—$ZrO_2$ (U.S. Pat. No. 4,474,686, October 1984). The substrate, layer 15, is typically glass, but may also be a plastic film or other material transparent in some region of the solar spectrum. Not shown in FIG. 1 is an additional quantity of lithium added to one or both of layers 11 and 13. This lithium is electrochemically active and may be shuttled between layers 11 and 13 is response to an externally applied voltage at the transparent electrodes (10,14). The electrochromic coating is typically fabricated by sequential sputtering or evaporation of each layer, but other processes such as chemical vapor deposition (CVD) or plasma enhanced CVD may also be employed.

The anodically coloring electrochromic material of the present invention is $M_yCrO_{2+x}$ ($0.33 \leq y \leq 2.0$, $x \leq 2$ and $M = Li$, Na, or K) which has the property that it becomes increasingly transparent on reduction over a broad wavelength range from 300 nm to 1400 nm. This wavelength range incorporates the entire visible spectrum (390-710 nm) and most of the solar spectrum.

$M_yCrO_{2+x}$ undergoes reversible lithium insertion (reduction) and extraction (oxidation) as shown in the following reaction Using $WO_3$ as an example of a cathodically coloring electrochromic material, the overall electrochromic reaction is written as The $M_yCrO_{2+x}$ electrochromic materials, and $Li_yCrO_{2+x}$ in particular, have an exceptionally high capacity for reversible lithium intercalation. The average lithium capacity of $Li_yCrO_{2-x}$, for example, is 600 $mC/cm^2$ per $\mu m$ of film thickness. This value compares with $\sim 100$ $mC/cm^2$-$\mu m$ for amorphous $WO_3$ and $V_2O_5$ which are well known electrochromic materials. Since most practical electrochromic devices are expected to transfer a maximum of 20 $mC/cm^2$ during optical switching, the high capacity of $M_yCrO_{2+x}$ allows it to be used as a very thin film, typically only 50 nm thick. Thin films are advantageous optically since they have low residual absorption, permitting a higher maximum transmittance by the electrochromic coating. Economically, thin films are advantageous since the costs associated with vacuum deposition, particularly sputter deposition, are significantly reduced.

Figure 2:
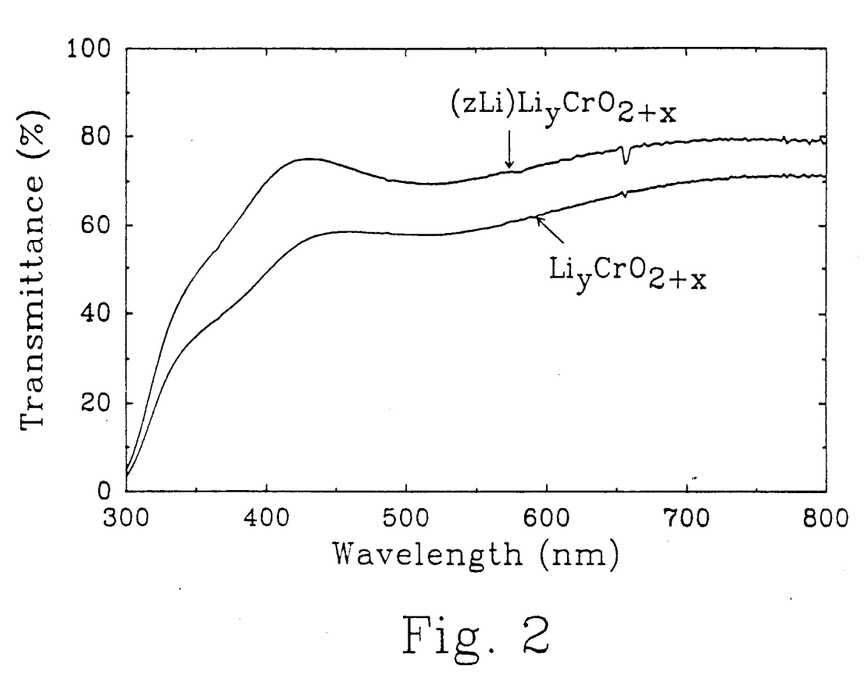
FIG. 2 shows the spectral transmittance of $Li_yCrO_{2+x}$ reduced and oxidized.
Figure 3:
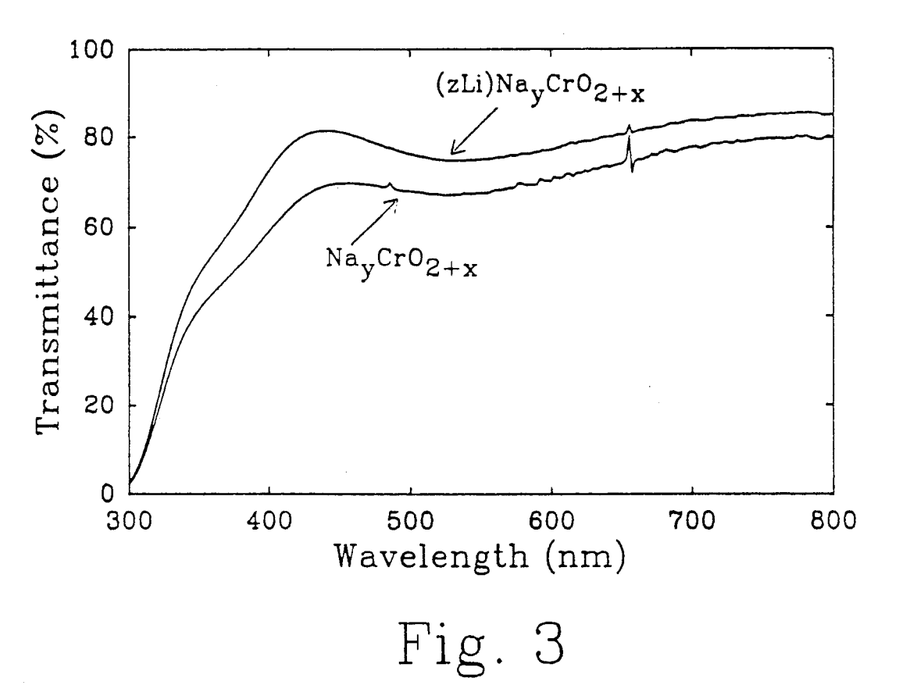
FIG. 3 shows the spectral transmittance of $Na_yCrO_{2+x}$ reduced and oxidized.

Referring to FIG. 2, the transmittance spectrum of a 40 nm thick $Li_yCrO_{2-x}$ film is shown after reduction to $(zLi)Li_yCrO_{2+x}$ and after lithium extraction (oxidation). Over the entire wavelength range shown (300-800 nm), $(zLi)Li_yCrO_{2+x}$ becomes less transparent on oxidation. Care should be taken to distinguish between electrochemically active lithium (z) and chemically bonded lithium (y). Similar spectral data for a $z(Li)Na_yCrO_{2+x}$ film are shown in FIG. 3. Electrochromic materials that exhibit similar anodic coloration on lithium insertion/extraction are based on $V_2O_5$ and mixed oxides of vanadium and other transition metals. A description of the electrochromic properties of $V_2O_5$ can be found in Cogan et al., J. Appl. Phys., vol. 66 (1989), p. 1333. The vanadium oxides have the disadvantage that they are weakly colored in the near-infrared and red region of the visible spectrum when reduced. This weak cathodic coloration limits the maximum transmittance achievable with an electrochromic device employing vanadium oxide.

The $Li_yCrO_{2+x}$ material of the present invention can be prepared by heat treatment of lithiated $CrO_3$. The $CrO_3$ may be lithiated chemically by soaking $CrO_3$ powder in an n-butyllithium/hexane solution or by mixing $CrO_3$ with $Li_2CO_3$. The lithiated $CrO_3$ or $CrO_3$/$Li_2CO_3$ mixture is heated to a temperature of $\geq 196°$ C.

at which point reaction occurs to form the desired $Li_yCrO_{2+x}$ phase and an excess of electrochemically active lithium. The fabrication procedure is consistent with the formation of a ternary phase, either $LiCr_3O_8$ or $Li_2CrO_4$. During the lithiation and heat treatment process lithium is irreversibly consumed in reaction with the $CrO_3$ to yield $Li_yCrO_{2+x}$. Similar chemical compounds exist in the $Na_yCrO_{2+x}$ and $K_yCrO_{2+x}$ systems and have been described by Koksbang et al. in the J. Electrochem. Soc., vol 136 (1989), p. 598.

Figure 4:
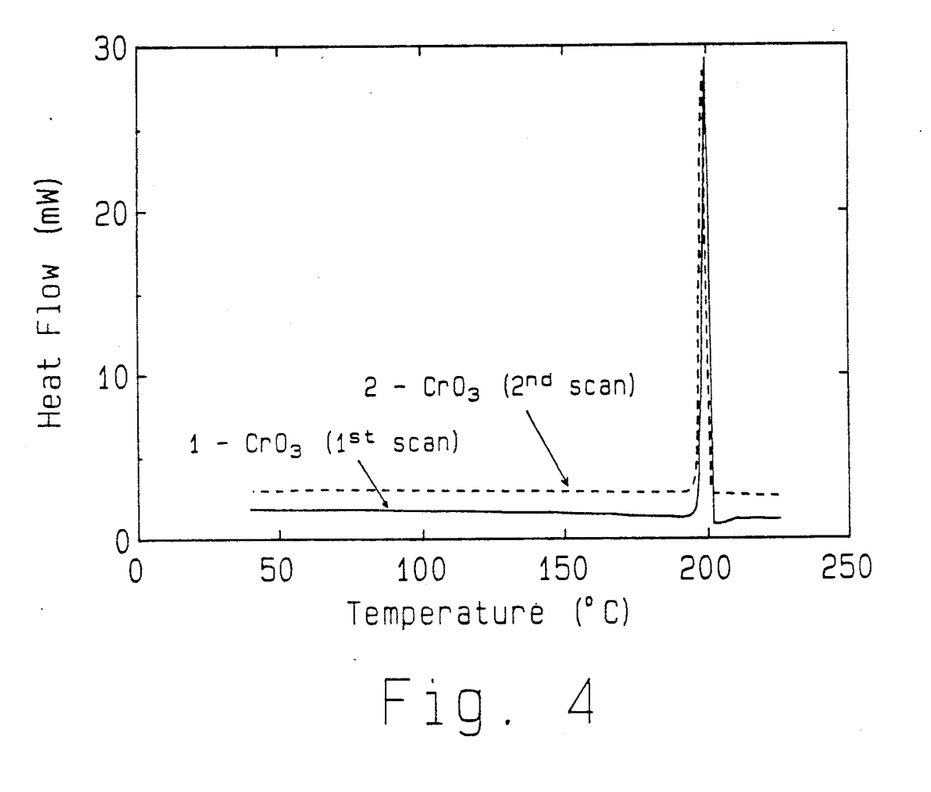
FIG. 4 is a differential scanning calorimetry chart of $CrO_3$ (curves 1 and 2).
Figure 5:
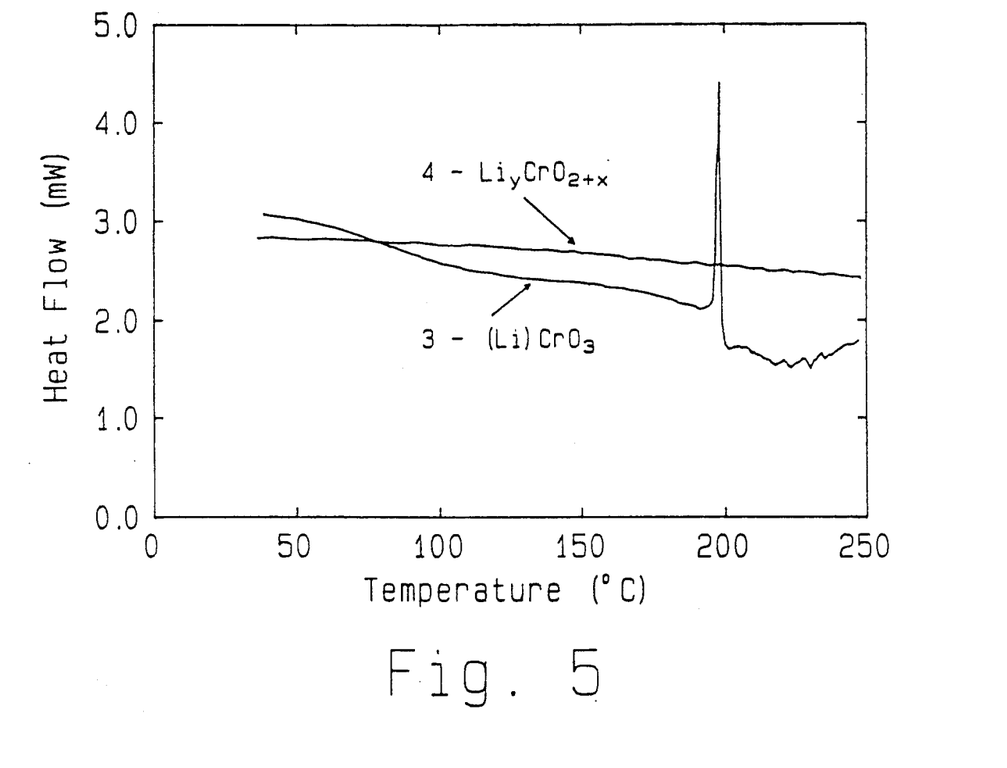
FIG. 5 is a differential scanning calorimetry chart of $(Li)CrO_3$ (curve 3) and $Li_yCrO_{2+x}$ (curve 4).

The reaction temperature and $Li_yCrO_{2+x}$ phase formation were confirmed by differential scanning calorimetry (DSC) and x-ray diffraction. In the DSC technique, a sample of material is heated at a constant rate (°C./min) and the heat required to maintain the rate measured as a function of temperature. The occurrence of exothermic and endothermic reactions can be used to monitor phase transformations and decomposition. In FIG. 4 curve 1, a DSC spectrum of $CrO_3$ is shown at a scan rate of 5° C./min from 40° C. to 250° C. There is a pronounced endothermic reaction at 196° C. corresponding to the melting point of pure $CrO_3$. When the same $CrO_3$ sample is subsequently cooled and reheated to 250° C., curve 2 (dashed) FIG. 4, melting is again observed at 196° C. From this result we conclude that there is no permanent phase change in $CrO_3$ on heating to 250° C. When lithiated $CrO_3$ ((Li)$CrO_3$) is subjected to the same thermal processing, shown in FIG. 5 curve 3, a prominent endothermic peak is observed on the first heating cycle at ~196° C., similar to that observed with pure $CrO_3$. However, after the same sample is cooled to room temperature and reheated to 250° C., curve 4 FIG. 5, there is no reaction at 196° C. because of the formation of $Li_yCrO_{2-x}$ on the first heating cycle. The $Li_yCrO_{2-x}$ has a higher melting point than $CrO_3$, as evidenced by the absence of melting in curve 4 FIG. 5. Although the DSC results confirm the formation of $Li_yCrO_{2+x}$ from lithiated $CrO_3$, they do not identify the particular ternary phase or phases of which $Li_yCrO_{2-x}$ is comprised.

X-ray diffraction spectra of $Li_yCrO_{2-x}$ suggest the presence of the ternary compounds $Li_2CrO_4$ and, to a lesser extent, $LiCr_3O_8$. It was not possible to deduce from the x-ray data whether the material of the present invention exists as a two phase mixture or as a solid solution with a broad composition range. Since the x-ray data showed the presence of the phases $LiCr_3O_8$ and $Li_2CrO_4$, the composition of $Li_yCrO_{2+x}$ is taken to include these phases and those compositions with intermediate lithium to chromium ratios. The ratio of lithium to chromium varies between y=0.33 for $LiCr_3O_8$ (i.e., $Li_{0.33}CrO_{2.67}$) and y=2.0 for $Li_2CrO_4$. Correspondingly, the ratio of oxygen to chromium varies from 2.67 (for $LiCr_3O_8$) to 4.0 (for $Li_2CrO_4$). Because oxide-based electrochromic materials are often substoichiometric in oxygen while maintaining the crystal structure and electrochromic properties of the fully oxidized material, the minimum oxygen content may be less than 2.67. The lithium content of $Li_yCrO_{2-x}$ is, therefore, $0.33 \leq y \leq 2.0$ while the oxygen content is $2+x$ with $x \leq 2.0$. Diffraction lines corresponding to $CrO_3$, $Cr_2O_3$, or $Li_2O$ were absent from the x-ray spectra.

X-ray photoelectron spectroscopy (XPS or ESCA) was also used in the characterization of $Li_yCrO_{2-x}$. The presence of chemically bonded lithium in $Li_yCrO_{2-x}$ was confirmed by analysis of a heat treated (Li)$CrO_3$ film from which all electrochemically active lithium was removed by oxidation in a 1N $LiClO_4$/propylene carbonate electrolyte. The XPS spectrum of the film revealed lithium, chromium, and oxygen.

Electrochemical characterization of $CrO_3$ and $Li_yCrO_{2+x}$ in organic and polymeric electrolytes reveals that $Li_yCrO_{2-x}$ is stable while the $CrO_3$ loses lithium capacity rapidly. An illustration of the superior stability of $Li_yCrO_{2+x}$ over $CrO_3$ is provided in Example 1. The lack of stability of (Li)$CrO_3$ in organic electrolytes has been identified previously in research on cathodes for rechargeable batteries (J. O. Besenhard and R. Schollhorn, J. Electrochem. Soc., 124, (1977) 968). In accordance with an object of the present invention, the greater stability of $Li_yCrO_{2+x}$ in organic media is advantageous in electrochromic devices employing polymeric ion conductors.

Furthermore, the melting point of $CrO_3$ is 196° C. which is disadvantageously low if elevated substrate temperatures are required during fabrication. In vacuo processing of $M_yCrO_{2+x}$ at 250° C. does not result in melting or decomposition while sputtered $CrO_3$ melts and sublimes at temperatures above 196° C. The $M_yCrO_{2+x}$, therefore, offers an advantage over electrochemically lithiated $CrO_3$ in electro-optical devices by virtue of possessing high temperature stability and being stable in contact with polymeric electrolytes.

In a preferred embodiment of the present invention, a method for in vacuo preparation of $Li_yCrO_{2-x}$ thin films is revealed. Initially, a thin film of $CrO_{3-k}$ is prepared by sputtering from a Cr or Cr-oxide target in an oxidizing atmosphere. Since sputtered oxide films, and vacuum deposited oxide films in general, are usually substoichiometric in oxygen, the as-deposited film does not have a precisely defined composition. A reasonable composition range for the film is $CrO_{3-k}$ where $k \leq 1.5$. This compositional assignment permits a stoichiometry between $Cr_2O_3$ and $CrO_3$, in which the Cr oxidation state varies between +3 and +6. The notation $CrO_{3-k}$ will be used in reference to vacuum deposited films. The as-deposited $CrO_{3-k}$ is lithiated in vacuo to form (Li)$CrO_{3-k}$. The lithiation may be accomplished by evaporating or sputtering lithium metal, sputtering lithium from $Li_2CO_3$, or by chemical vapor deposition from a volatile lithium containing compound. The (Li)-$CrO_{3-k}$ is then heated to 200° C. to form the $Li_yCrO_{2-x}$ electrochromic phase and an excess of electrochemically active lithium. The conversion of (Li)-$CrO_{3-k}$ to $Li_yCrO_{2+x}$ at 196° C. is sufficiently rapid that no loss of film is encountered in vacuum processing. The sodium and potassium analogs are prepared in a similar manner. More details of the fabrication are provided in the examples.

Figure 6:
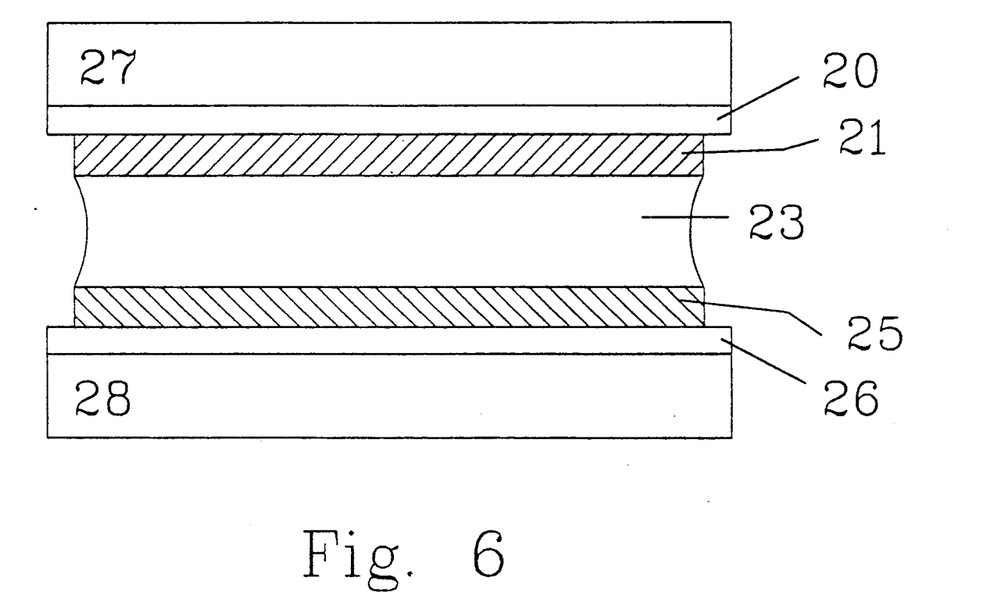
FIG. 6 is a cross-sectional view of an electro-optical device of the present invention embodying a polymeric ion conductor.

In another embodiment of the present invention, revealed in FIG. 6, a Li+ ion conducting polymer (23) replaces the solid ion conductor of the first embodiment. The Li+ conducting polymer is disposed between two glass substrates (layers 27 and 28) coated with transparent, electronically conducting layers of ITO (20,26). On one substrate is a layer (25) of a cathodically coloring electrochromic material (e.g., $WO_3$) and on the other substrate is a layer of $M_yCrO_{2+x}$ (21). The operation of the present embodiment is identical to the first, except that the switching voltage must remain within the oxidation and reduction limits of the polymeric ion conductor. Suitable polymeric Li+ conductors include polyethylene oxide, and mixtures of polyvinylpyrrolidone with polyethylene glycol, N-methypyrrolidone or γ-butyrolactone. These polymers contain Li salts such as $LiClO_4$, $LiCF_3SO_3$, or $LiBF_4$ to impart the desired ionic conductivity.

Figure 7:
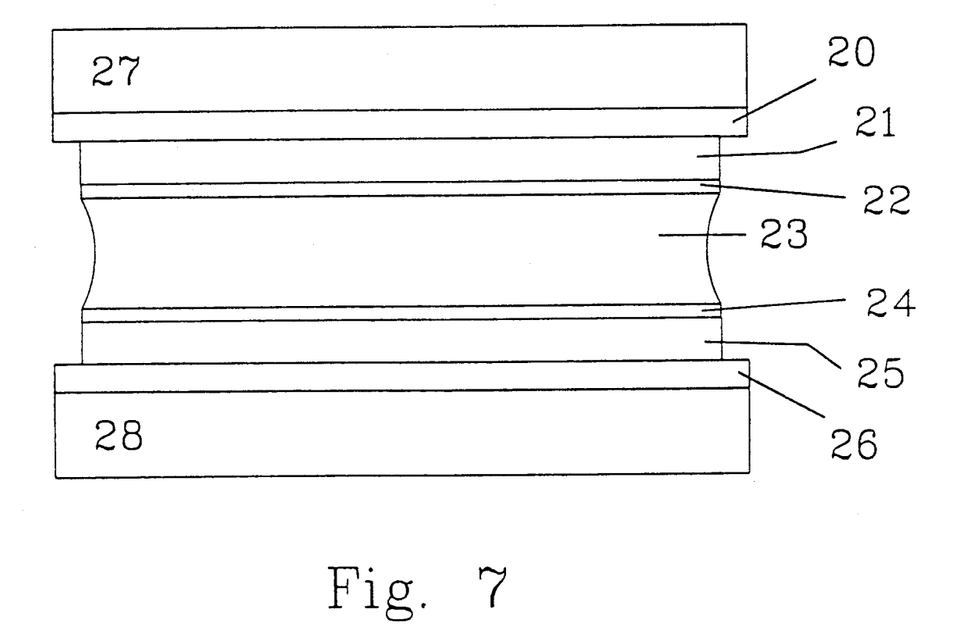
FIG. 7 is a cross-sectional view of an electro-optical device of the present invention embodying thin films of a solid $Li^+$ ion conductor to protect the polymeric ion conductor from electrochemical degradation.

In a variation on the previous embodiment of the present invention, revealed in FIG. 7, one or both of the $M_yCrO_{2+x}$ layer (21) and cathodically coloring electrochromic layer (25) are coated with a solid $Li^+$ ion conducting layer (22,24). The solid $Li^+$ ion conductor may be $LiAlF_4$, a $Li_2O$—$B_2O_3$ mixture, a $Li_2O$—$ZrO_2$—$SiO_2$ mixture or any of the various glassy lithium ion conducting solids or fast ion conductors. The advantage of the solid ion conductor is that it electronically separates the polymeric ion conductor (23) from the $M_yCrO_{2+x}$ and cathodically coloring electrochromic layer. This can lead to an improvement in switching speed and long-term stability of the electro-optical device by protecting the polymer from oxidation and reduction reactions associated with electromotive potential variations on the $M_yCrO_{2+x}$ and electrochromic layer during switching. Oxidation and reduction reactions at the polymer/$M_yCrO_{2+x}$ or polymer/electrochromic layer interface are expected to occur if the electromotive potential is driven outside a 1.5 to 4.5 V window (measured with respect to a $Li^+$/Li reference electrode). The electrochemical stability at the interface between the electrochromic materials and the solid $Li^+$ ion conductor has a larger potential window, particular for oxide ion conductors, and can tolerate larger potential excursions without irreversible oxidative or reductive degradation. The potential at the interface between the polymer and solid ion conductor is significantly reduced since the solid ion conductor is a good electronic insulator. An increase in switching speed may be obtained by virtue of using higher switching voltages than would be possible without the solid $Li^+$ ion conducting layers.

EXAMPLE 1

A $Li_yCrO_{2-x}$ film was fabricated by reactive RF sputtering of $CrO_{3-k}$ from a chromium metal target in an 80% argon/20% oxygen gas atmosphere onto a tin-doped indium oxide (ITO) substrate. A total sputter gas pressure of 100 μm and RF power density of 5 watts/cm$^2$ with a 7 cm target-to-substrate spacing was employed. The as-deposited $CrO_{3-k}$ film was lithiated by RF sputtering lithium from a $Li_2CO_3$ target in an argon atmosphere to form a (Li)$CrO_{3-k}$ film. The $Li_2CO_3$ decomposes during sputtering to yield lithium metal and volatile gas components that are removed by the vacuum pumping system. The (Li)$CrO_{3-k}$ was converted to $Li_yCrO_{2-x}$ and electro-active lithium by heating to 200° C. in a vacuum.

Figure 8A:
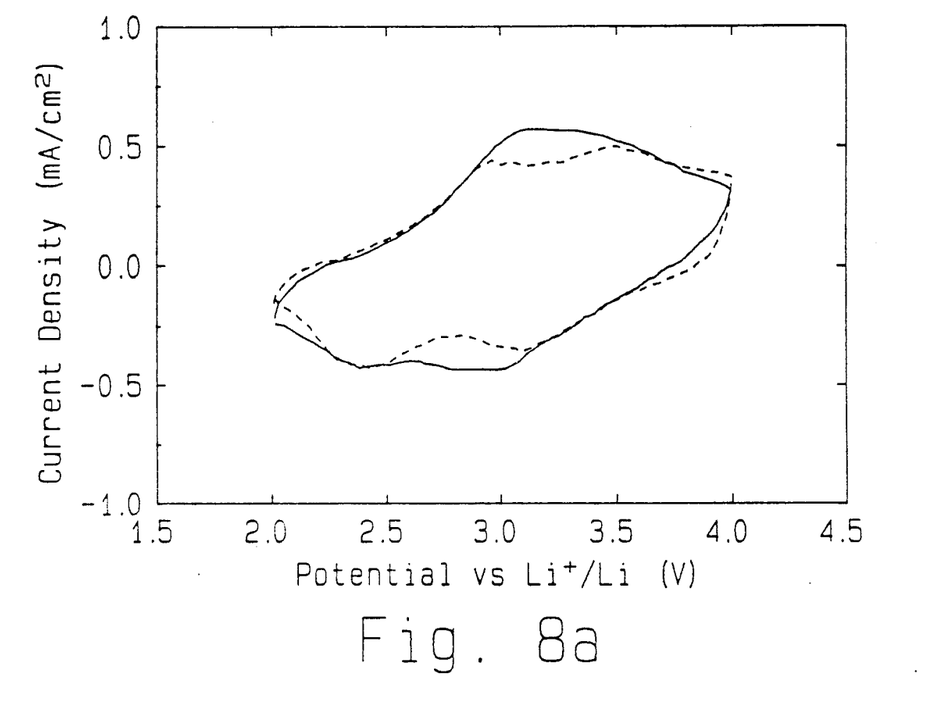
FIG. 8a is a comparison of the cyclic voltammetric behavior of $Li_yCrO_{2+x}$ before and after 74 hours of continuous switching.

Referring to FIG. 8a, two cyclic voltammograms of a $Li_yCrO_{2+x}$ film are shown. The voltammograms were acquired in an electrolyte of 1N $CF_3SO_3Li$ in γ-butyrolactone at a sweep rate of 20 m V/s. Positive current indicates the (zLi)$Li_yCrO_{2+x}$ is being oxidized (Li extraction) and negative current indicates reduction (Li insertion). The solid curve in FIG. 8a represents the $Li_yCrO_{2-x}$ film at the onset of a multi-cycle switching experiment. The area within the curve is directly proportional to the quantity of lithium inserted and extracted on each cycle and equals 18 mC/cm$^2$ (1 mC equals 6×10$^{15}$ lithium ions). After 74 hours of continuous cycling, representing 1332 switching cycles, the insertion capacity of the film declines only slightly to 17 mC/cm$^2$. The corresponding cyclic voltammogram is shown as the dashed curve in FIG. 8a. The amount of lithium being extracted and inserted into the $Li_y$-$CrO_{2+x}$ film is equal on each cycle of the voltammogram and the reaction is reversible.

Figure 8B:
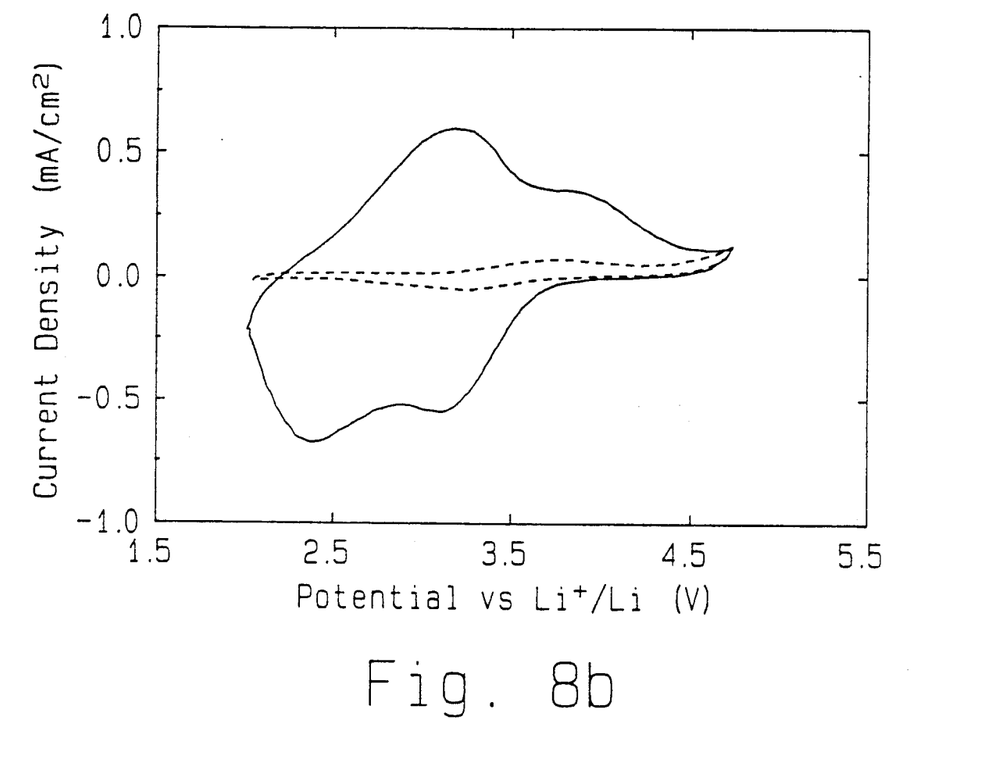
FIG. 8b is a comparison of the cyclic voltammetric behavior of $CrO_{3-k}$ before and after 15 hours of continuous switching.

FIG. 8b compares similar data for electrochemically lithiated $CrO_{3-k}$. The initial cyclic voltammogram (solid curve) is similar to $Li_yCrO_{2-x}$ and the lithium insertion/extraction equals 16 mC/cm$^2$ on each cycle. After switching for 15 hours, however, the lithium capacity is reduced to less than 1 mC/cm$^2$. The cyclic voltammogram after 15 hours is shown as the dashed curve in FIG. 8b.

EXAMPLE 2

A solid-state electrochromic device was fabricated in the following manner. A 40 nm thick film of $CrO_{3-k}$ was sputtered onto an ITO-coated glass substrate using the deposition parameters described in Example 1. The $CrO_{3-k}$ film was lithiated by sputtering lithium from a $Li_2CO_3$ target in an argon atmosphere. The (Li)-$CrO_{3-k}$ film was then heat treated at 200° C. to form $Li_yCrO_{2+x}$ and an excess of lithium. A $Li^+$ ion conducting layer of $Li_2O$—$B_2O_3$ was subsequently deposited onto the (zLi)$Li_yCrO_{2+x}$ by thermal evaporation at a substrate temperature of 200° C. A layer of cathodically coloring $WO_3$ was evaporated over the $Li_2O$—$B_2O_3$ and an electronic contact of chromium metal sputter deposited over the $WO_3$. In this configuration, the device has the property of being a variable reflectance mirror when viewed from the glass substrate side.

Figure 9:
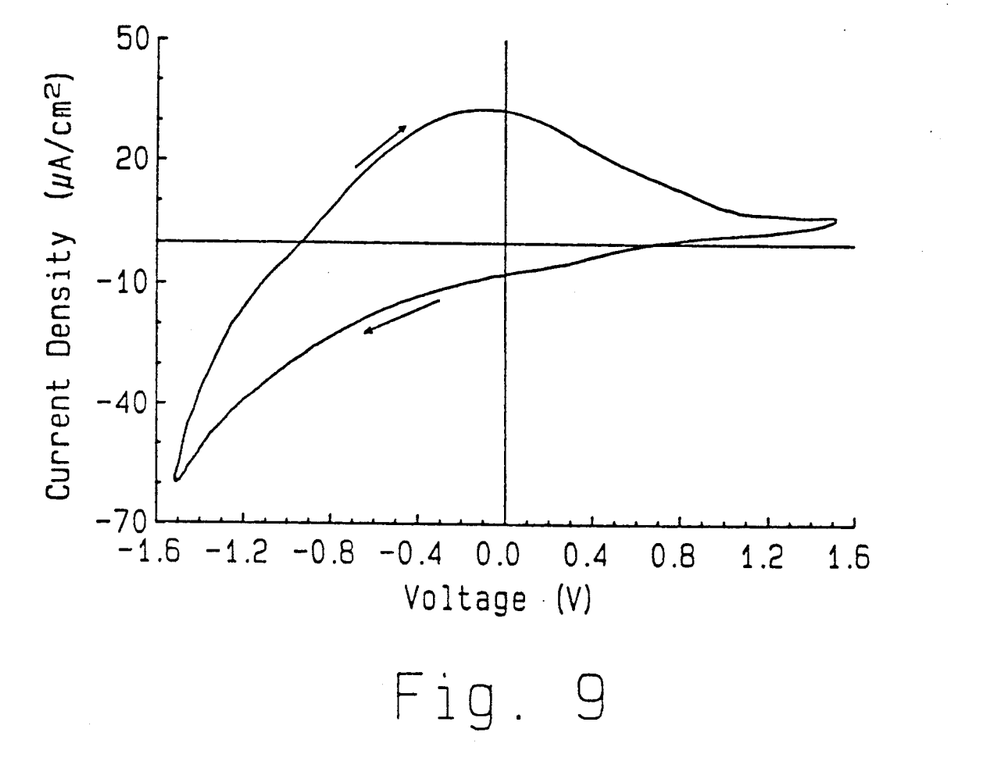
FIG. 9 is the current-voltage behavior of a solid-state variable reflectance device of the present invention.

The current-voltage (IV) characteristics of the electrochromic device were determined by imposing a triangular voltage sweep between the ITO and Cr-metal contacts and recording the corresponding current flow. The IV curve is revealed in FIG. 9. The IV characteristics are reproducible from cycle to cycle and the charge transport in either direction is equal. During the imposition of the voltage sweep the device switches between an optically reflective state and a deep blue, non-reflective state.

EXAMPLE 3

An all-solid-state variable transmittance electrochromic coating was fabricated by sputter depositing $CrO_{3-k}$ onto an ITO-coated glass substrate. The $CrO_{3-k}$ was lithiated by thermal evaporation of lithium at an ambient substrate temperature. The as-lithiated (Li)$CrO_{3-k}$ was heated to 200° C. in vacuo to form $Li_yCrO_{2+x}$ and an excess of electrochemically active lithium. A 900 nm thick ion conducting film of $Li_2O$—$B_2O_3$ was thermally evaporated onto the $Li_y$-$CrO_{2+x}$ at 200° C. in 2×10$^{-4}$ torr background pressure of oxygen and allowed to cool slowly (2°-4° C./min) to room temperature. An electrochromic film of a-$WO_3$ was e-beamed evaporated onto the $Li_2O$—$B_2O_3$. The a-$WO_3$ was a e-beamed in 2×10$^{-4}$ torr of oxygen at a substrate temperature of 80°-140° C. A top electronic contact of ITO was deposited by RF sputter deposition from a ceramic ITO target at an Ar pressure of 8 μm and a substrate temperature of 200° C.

Figure 10:
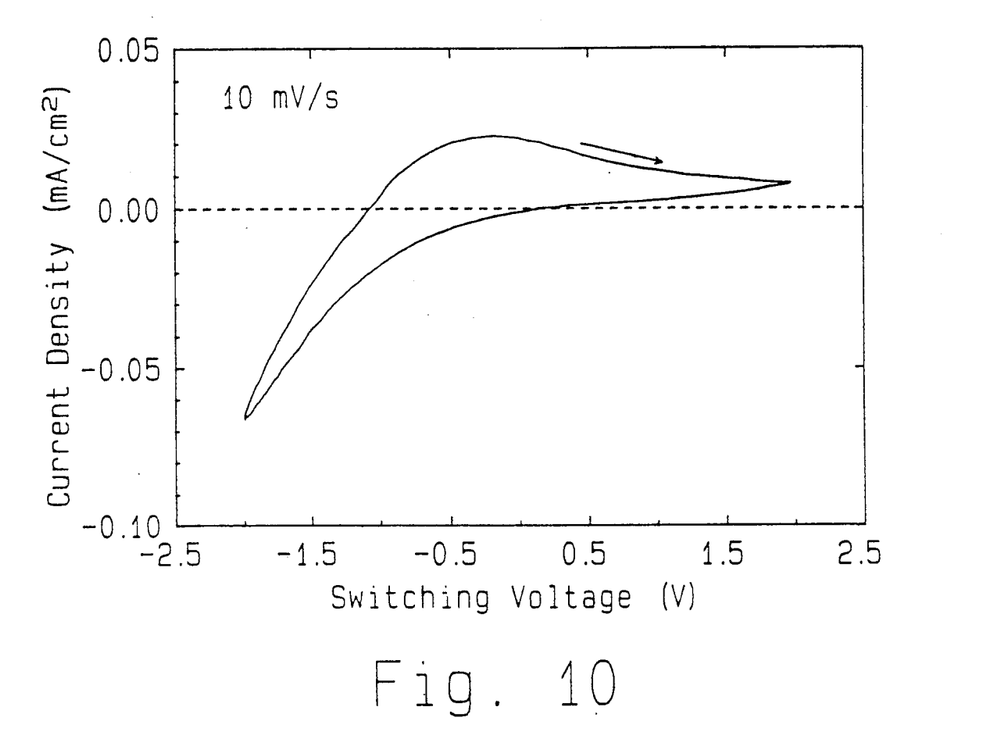
FIG. 10 is the current-voltage behavior of a solid-state variable transmittance device of the present invention.
Figure 11:
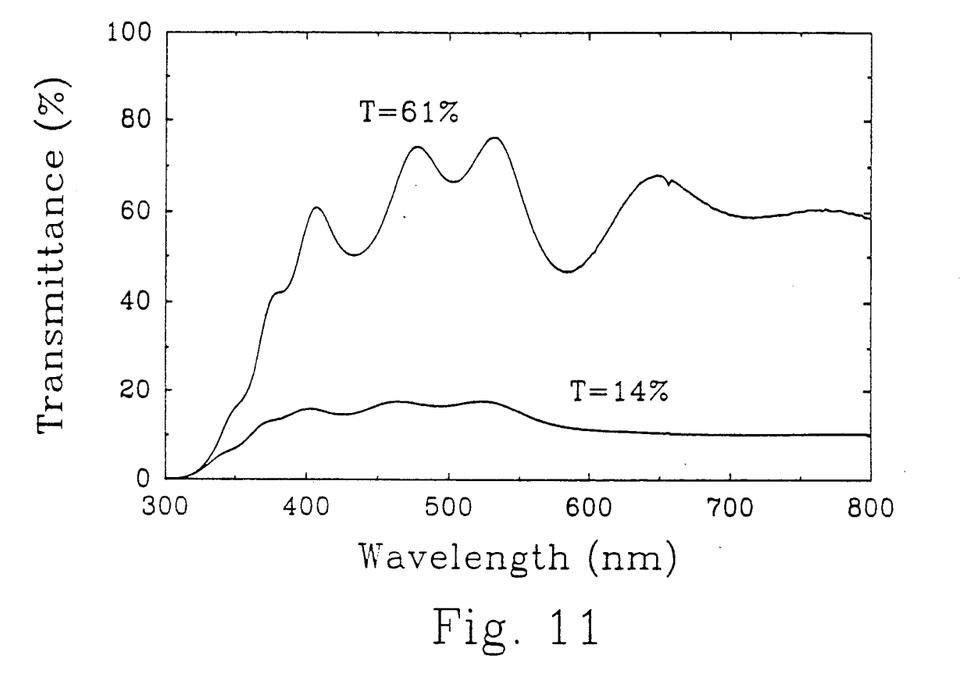
FIG. 11 is the spectral transmittance range of a solid-state variable transmittance device of the present invention.

The current-voltage characteristics of the variable transmittance device were measured by imposing a triangular voltage sweep between the top and bottom ITO contacts and recording the current flow. The IV characteristics of the device are shown in FIG. 10 for a sweep rate of 10 mV/s between voltage limits of ±2 volts. The device reversibly transfers lithium between the $Li_yCrO_{2-x}$ layer and the a-$WO_3$ layer. The optical transmittance spectra of the device held at ±2 volts are shown in FIG. 11. The luminous transmittance of the device varied from 61% to 14%.

EXAMPLE 4

A film of sputtered $CrO_{3-k}$ was intercalated with Na electrochemically in a 1N $NaClO_4$/propylene carbonate electrolyte. The $(Na)CrO_{3-k}$ film was heat treated at 200° C. to form $Na_yCrO_{2+x}$ and some excess Na which was removable electrochemically. The $Na_yCrO_{2+x}$ could be intercalated and deintercalated with lithium electrochemically in a 1N $LiClO_4$/propylene carbonate electrolyte. The luminous transmittance of the $(zLi)Na_yCrO_{2+x}$ increased from 69% to 76% on 15 $mC/cm^2$ of lithium intercalation. The transmittance spectra are shown in FIG. 3.

What is claimed is:

1. An electro-optical device comprising a first substrate,
    a first electronic contact disposed over said first substrate,
    a layer comprised of $M_yCrO_{2+x}$ where $0.33 \leq y \leq 2.0$, $x \leq 2$, and M = Li, Na, or K, said $M_yCrO_{2+x}$ coloring on oxidation,
    a layer comprised of an electrochromic material, said electrochromic material coloring on reduction.
    a $Li^+$ ion conducting layer disposed between said $M_yCrO_{2+x}$ and said reductively coloring electrochromic layer,
    said $M_yCrO_{2+x}$ layer or said reductively coloring electrochromic layer being disposed on said first electronic contact
    a second electronic contact disposed over said previous layers
    wherein, one or both of said $M_yCrO_{2+x}$ and said reductively coloring electrochromic material are partially reduced by electro-active lithium, and whereby said electro-active lithium is distributed between said $M_yCrO_{2+x}$ and said reductively coloring electrochromic layer in a manner determined by the magnitude and polarity of a voltage applied between said electronic contacts, said electro-active lithium distribution determining the optical state of said device.

2. The electro-optical device of claim 1, wherein a second substrate is disposed over said second electronic contact, one or both of said first or second substrates being substantially transparent.

3. The electro-optical device of claim 2, wherein said $Li^+$ ion conducting layer is a polymer.

4. The electro-optical device of claim 3, wherein one or both of said $M_yCrO_{2+x}$ and reductively coloring electrochromic layers are coated with a solid $Li^+$ ion conducting layer, said solid $Li^+$ ion conducting layer being disposed between said $M_yCrO_{2+x}$ or reductively coloring electrochromic layer and said polymeric $Li^+$ conducting layer.

5. The electro-optical device of claim 1, wherein said reductively coloring electrochromic material is amorphous or crystalline and chosen singly or as a mixture from the group tungsten oxide, molybdenum oxide, and potassium hexatungstate.

6. The electro-optical device of claim 1, wherein said $Li^+$ conducting layer is selected from the group consisting of lithium based oxides and glassy lithium ion conductors.

7. The electro-optical device of claim 3, wherein said polymeric $Li^+$ ion conductor is selected from the group polyethylene oxide, mixtures of polyvinylpyrrolidone with polyethylene glycol, and polyvinylpyrrolidone with N-methylpyrrolidone or γ-butyrolactone, all containing dissolved lithium salts.

8. The electro-optical device of claim 1, wherein said electronic contacts are substantially transparent and selected from the group tin-doped indium oxide, antimony-doped tin oxide, or aluminum-doped zinc oxide.

9. The electro-optical device of claim 1, wherein one of said electronic contacts is optically reflective.

10. The electro-optical device of claim 9, wherein said optically reflective contact is selected from the group gold, silver, nickel, aluminum, or chromium.

11. The electro-optical device of claim 6, wherein said $Li^+$ ion conductor is a mixture of $Li_2O$ and $B_2O_3$.

* * * * *